(12) United States Patent
Li et al.

(10) Patent No.: US 8,550,231 B2
(45) Date of Patent: Oct. 8, 2013

(54) CONVEYING DEVICE

(75) Inventors: Hai-Yuan Li, Shenzhen (CN);
Chia-Peng Day, Santa Clara, CA (US);
Shih-Ying Shen, New Taipei (TW);
Wen-Tao Wang, Shenzhen (CN);
Xue-Shun Xing, Shenzhen (CN)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 11 days.

(21) Appl. No.: 13/458,430

(22) Filed: Apr. 27, 2012

(65) Prior Publication Data
US 2013/0105281 A1    May 2, 2013

(30) Foreign Application Priority Data
Oct. 31, 2011    (CN) .......................... 2011 1 0337329

(51) Int. Cl.
*B65G 17/12*    (2006.01)
(52) U.S. Cl.
USPC .................................. 198/468.6; 198/750.14
(58) Field of Classification Search
USPC .......... 198/468.6, 468.8, 468.9, 621.1, 750.1, 198/750.14
See application file for complete search history.

(56) References Cited

U.S. PATENT DOCUMENTS

| | | | | |
|---|---|---|---|---|
| 4,003,476 A | * | 1/1977 | Laskey | 198/468.6 |
| 4,688,668 A | * | 8/1987 | Ookubo et al. | 198/621.1 |
| 6,095,317 A | * | 8/2000 | Waldner et al. | 198/463.2 |
| 6,766,897 B2 | * | 7/2004 | Kuwabara | 198/750.1 |
| 7,165,665 B2 | * | 1/2007 | Casper et al. | 198/346.3 |
| 7,234,912 B2 | * | 6/2007 | Cisar | 414/751.1 |
| 8,132,662 B1 | * | 3/2012 | Chen | 198/468.9 |

* cited by examiner

*Primary Examiner* — James R Bidwell
(74) *Attorney, Agent, or Firm* — Altis & Wispro Law Group, Inc.

(57) ABSTRACT

A conveying device includes a housing, a linear driving mechanism, a first sliding assembly, a second sliding assembly, and a carrying mechanism. The linear driving mechanism is assembled within the housing. The first sliding assembly is slidably assembled together with the second sliding assembly within the housing, and both sliding assemblies are driven by the linear driving mechanism to slide horizontally. The carrying mechanism is slidably sandwiched between the first sliding assembly and the second sliding assembly. The first sliding assembly and the second sliding assembly are driven by the linear driving mechanism to slide within the housing along either a same direction or along opposite directions. The carrying mechanism may slide linearly together with the first sliding assembly and the second sliding assembly, or slide upwards and downwards perpendicular to the linear sliding direction of the first sliding assembly and the second sliding assembly.

15 Claims, 7 Drawing Sheets

CONVEYING DEVICE

BACKGROUND

1. Technical Field

The present disclosure relates to conveying devices, and more particularly, to a conveying device for conveying workpieces in a machining process.

2. Description of Related Art

Conveying devices convey workpieces during a mechanical machining process. Many conveying devices include a mounting seat, a driving assembly mounted on the mounting seat, and a sliding member driven by the driving assembly. However, the sliding member is capable of sliding relative to the mounting seat along one direction only. In addition, the conveying device of related art, having a complicated structure, takes up a larger amount of space during usage.

Therefore, there is room for improvement in the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
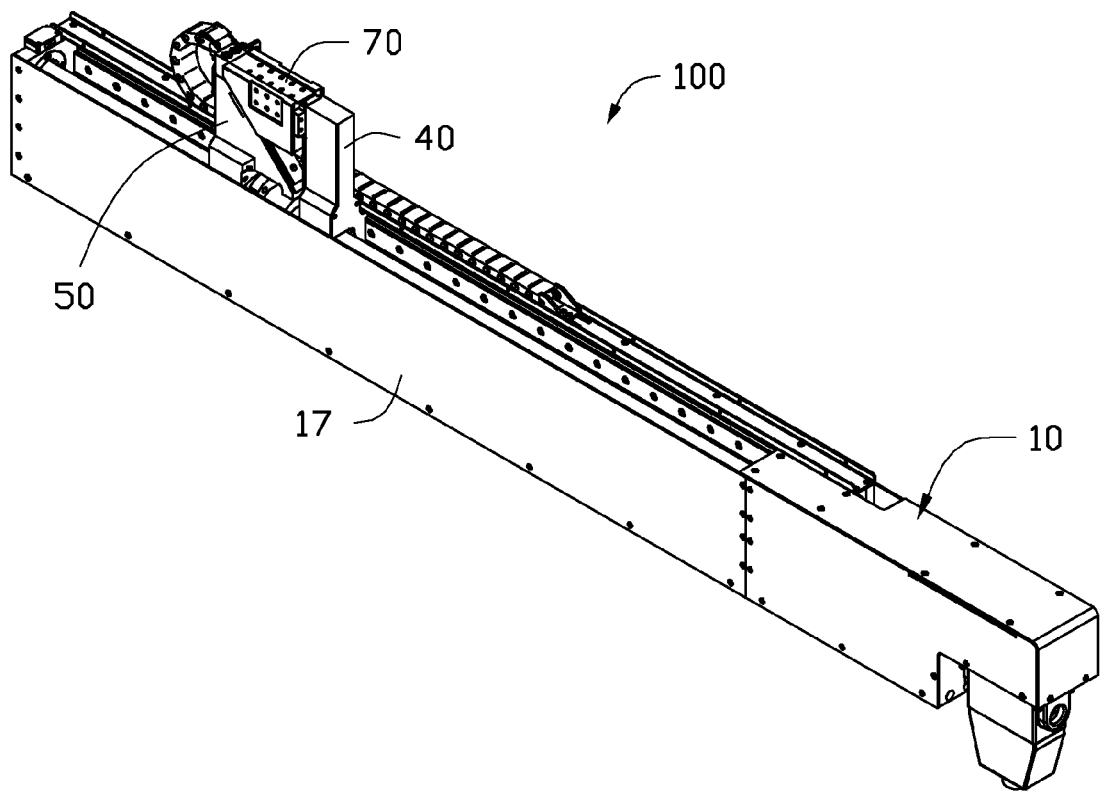
FIG. 1 is an isometric view of an embodiment of a conveying device.
Figure 2:
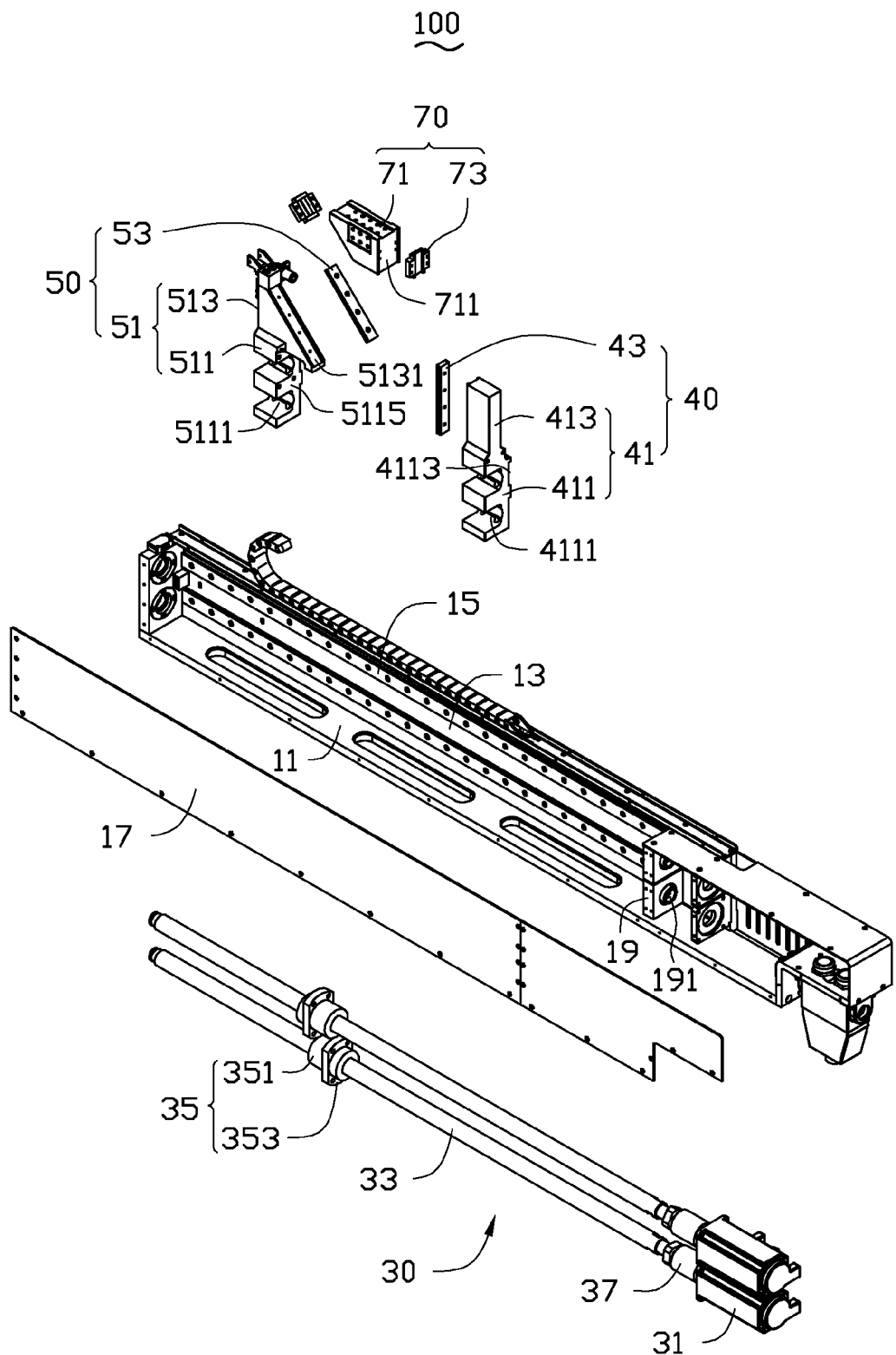
FIG. 2 shows an exploded, isometric view of the conveying device of FIG. 1, wherein the conveying device includes a housing, a linear driving mechanism, a carrying mechanism, a first sliding assembly and a second sliding assembly.

Referring to FIGS. 1 and 2, an embodiment of a conveying device 100 includes a housing 10, a linear driving mechanism 30, a first sliding assembly 40, a second sliding assembly 50, and a carrying mechanism 70. The first sliding assembly 40 and the second sliding assembly 50 are slidably assembled within the housing 10 via the linear driving mechanism 30. The carrying mechanism 70 is slidably sandwiched between the first sliding assembly 40 and the second sliding assembly 50, for carrying one or more workpieces (not shown). In the illustrated embodiment, the first sliding assembly 40 and the second sliding assembly 50 are capable of being driven by the linear driving mechanism 30 to slide within the housing 10 horizontally, along the same direction or along two opposite directions. The carrying mechanism 70 is thus driven by the first sliding assembly 40 and the second sliding assembly 50 to slide linearly together with the first sliding assembly 40 and the second sliding assembly 50, or to slide upwards and downwards along a direction perpendicular to the sliding direction of the first sliding assembly 40 and the second sliding assembly 50.

The housing 10 includes a bottom plate 11, a supporting plate 13, a pair of guiding rails 15, a cover plate 17, and two support blocks 19. The bottom plate 11 is a substantially rectangular board in the shape of a bar. The supporting plate 13 extends substantially perpendicularly from one side of the bottom plate 11. The pair of guiding rails 15 are both solid bars, and are mounted parallel to each other on an inner surface of the supporting plate 13, along a longitudinal direction of the bottom plate 11. The two supporting blocks 19 are oppositely mounted on two ends of the bottom plate 11, and resist against the two ends of the pair of guiding rails 15. Each supporting block 19 defines two pivotal holes 191 corresponding to the pair of guiding rails 15. The cover plate 17 is detachably mounted to the other side of the bottom plate 11, and positioned parallel to the opposite supporting plate 13. In the illustrated embodiment, the supporting plate 13 and the bottom plate 11 are integrally formed. The two guiding rails 15 are fixed parallel to each other to the supporting plate 13 via screw fasteners (not labeled).

The linear driving mechanism 30 is mounted within the housing 10, and includes two drivers 31, two screw rods 33, two screw members 35, and two shaft couplings 37. The two screw rods 33 are assembled parallel to each other within the housing 10, and parallel to the two guiding rails 15. The ends of the two screw rods 33 are rotatably assembled into the pivotal holes 191 of the two supporting blocks 19. The drivers 31 are assembled within the housing 10 and connected to the screw rods 33, via the shaft couplings 37, thereby enabling the two screw rods 33 to rotate. In the illustrated embodiment, the two drivers 31 are two motors. The screw members 35 are rotatably sleeved on the screw rods 33. In use, the screw members 35 are moved longitudinally along the screw rods 33, when the two screw rods 33 are driven to rotate. The screw member 35 includes a screw nut 351 and a fixing flange 353 formed on the screw nut 351.

Figure 3:
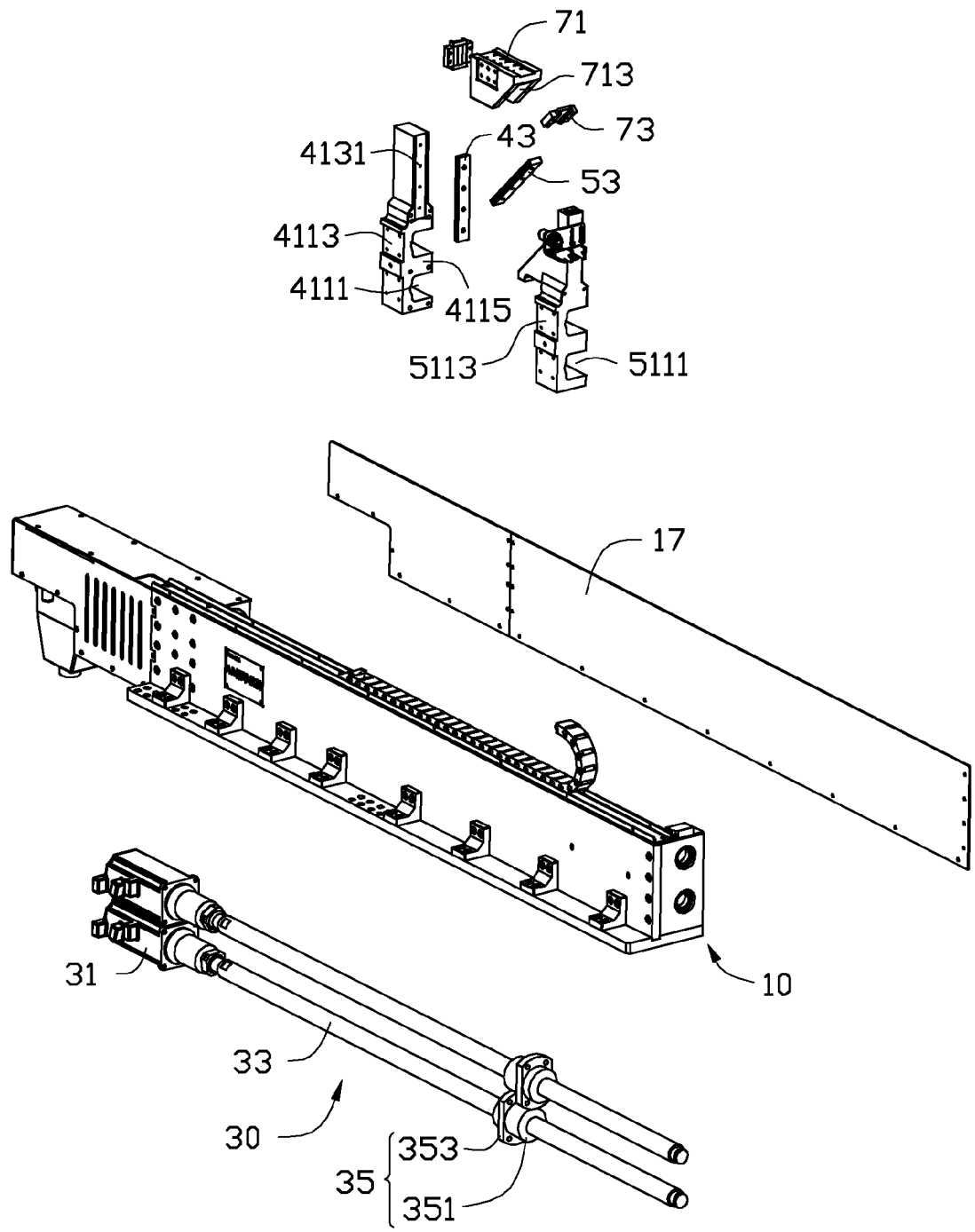
FIG. 3 is similar to FIG. 2, but viewed from another aspect.

Also referring to FIG. 3, the first sliding assembly 40 is slidably engaged with the pair of first guiding rails 15, and further fixed with the fixing flange 353 of one screw member 35, such that the first sliding assembly 40 is capable of being driven to move linearly along the screw rod 33 sliding on the pair of guiding rails 15. The first sliding assembly 40 includes a first sliding member 41 and a first sliding rail 43 fixed to one side of the first sliding member 41. The first sliding member 41 includes a base portion 411 and a mounting portion 413 formed on one end of the base portion 411. The base portion 411 is a substantially rectangular block, and defines a pair of guiding grooves 4111 in one side surface of the base portion 411 corresponding to the two screw rods 33, and a pair of sliding grooves 4113 in an opposite side surface of the base portion 411 corresponding to the pair of guiding rails 15. The mounting portion 413 is bar-shaped and integrally formed on one end of the base portion 411. The mounting portion 413 includes a mounting side surface 4131. The first sliding rail 43 is a substantially rectangular bar of material and is fixed to the mounting side surface 4131 of the mounting portion 413.

The second sliding assembly 50 has a structure similar to that of the first sliding assembly 40. The second sliding assembly 50 is also slidably engaged with the pair of guiding rails 15, and fixed with the fixing flange 353 of the other screw member 35, such that, the second sliding assembly 50 is capable of being driven to move linearly along the other screw rod 33, and being supported on the pair of guiding rails 15. The second sliding assembly 50 includes a second sliding member 51 and a second sliding rail 53 fixed to one side of the second sliding member 51. The second sliding member 51 includes a main portion 511 and an assembling portion 513 formed on one end of the main portion 511. The main portion 511 has substantially the same shape as the base portion 411 of the first sliding member 41. The main portion 511 defines a pair of guiding grooves 5111 in one side surface thereof corresponding to the two screw rods 33, and a pair of sliding grooves 5113 in an opposite side surface of the main portion 511 corresponding to the pair of guiding rails 15. The assembling portion 513 is wedge-shaped and integrally formed on one end of the main portion 511. The assembling portion 513 includes an inclined mounting side surface 5131 facing toward the adjacent mounting side surface 4131 of the first sliding member 41. The second sliding rail 53 is bar-shaped and fixed to the inclined mounting side surface 5131.

The carrying mechanism 70 is slidably sandwiched between the first sliding assembly 40 and the second sliding assembly 50, for carrying the workpieces. The carrying mechanism 70 includes a carrying body 71 and two sliding sleeves 73. The carrying body 71 is a substantially inverted trapezoid, and includes a vertical side surface 711 and an opposite non-vertical, or inclined, side surface 713. The sliding sleeves 73 are oppositely fixed to the vertical side surface 711 and the opposite inclined side surface 713, respectively, for slidably engaging with the first sliding rail 43 and the second sliding rail 53.

Figure 4:
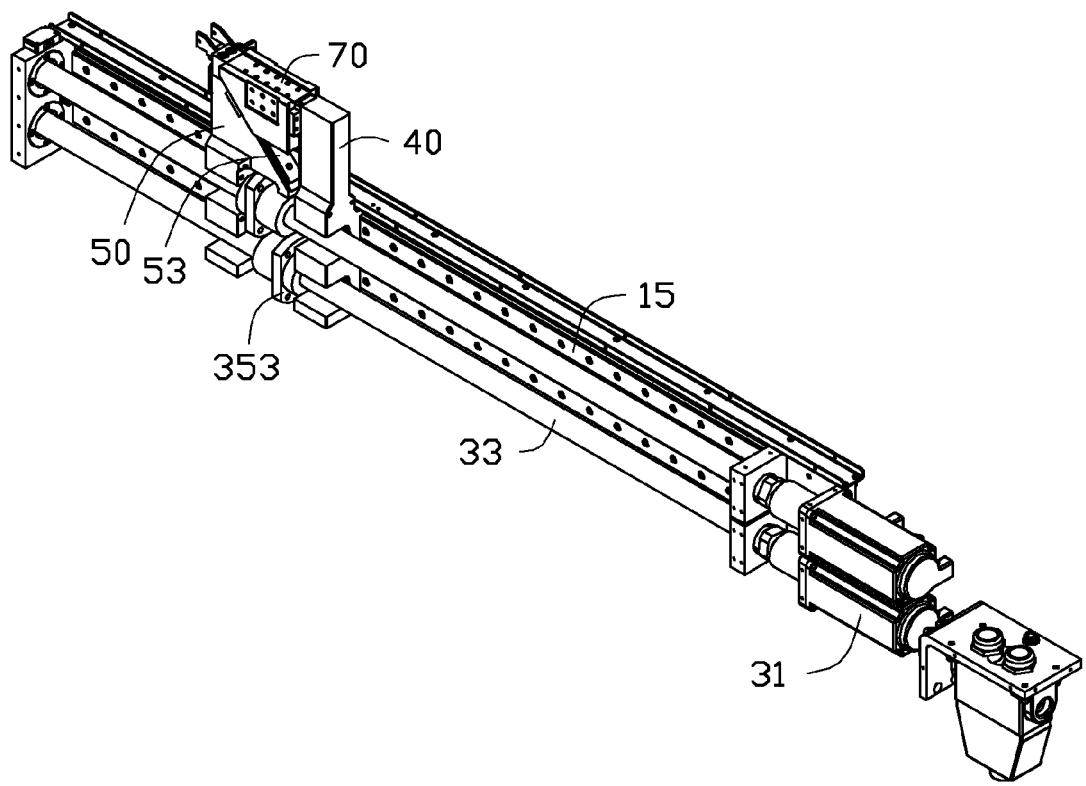
FIG. 4 shows a partially assembled, isometric view of the conveying device of FIG. 1, wherein a cover plate is omitted.
Figure 5:
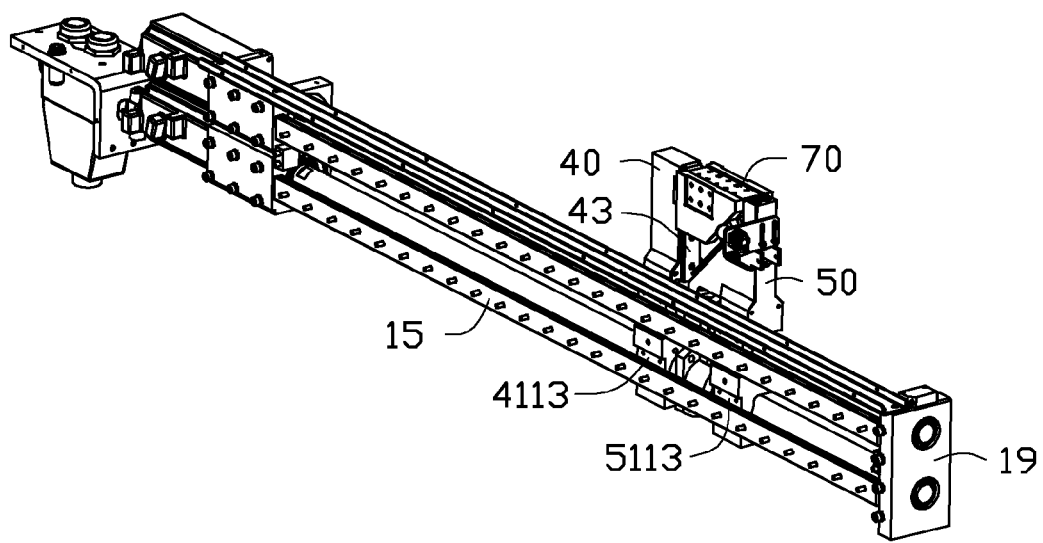
FIG. 5 is similar to FIG. 4, but viewed from another aspect.

Also referring to FIGS. 4 and 5, in assembly, the first sliding assembly 40 and the second sliding assembly 50 are slidably mounted to the supporting plate 13 of the housing 10, the guiding rails 15 of the supporting plate 13 slidably engage with the sliding grooves 4113, 5113 of the first and second sliding members 41, 51. The two screw rods 33 of the linear driving mechanism 30 together with the two screw members 35 and the two drivers 31, are assembled into the housing 10, and positioned parallel to the two guiding rails 15. The two screw rods 33 pass through the guiding grooves 4111, 5111 of the first and second sliding members 41, 51 and the ends of the two screw rods 33 are rotatably assembled to the pivotal holes 191 of the two supporting blocks 19 of the housing 10. The fixing flanges 353 of the two screw members 35 are respectively fixed with the first and second sliding members 41, 51. The carrying mechanism 70 is slidably assembled by being sandwiched between the first sliding assembly 40 and the second sliding assembly 50 to complete the assembly of the conveying device 100, and the sliding sleeves 73 of the carrying mechanism 70 slidably engage with the first sliding rail 43 and the second sliding rail 53.

Figure 6:
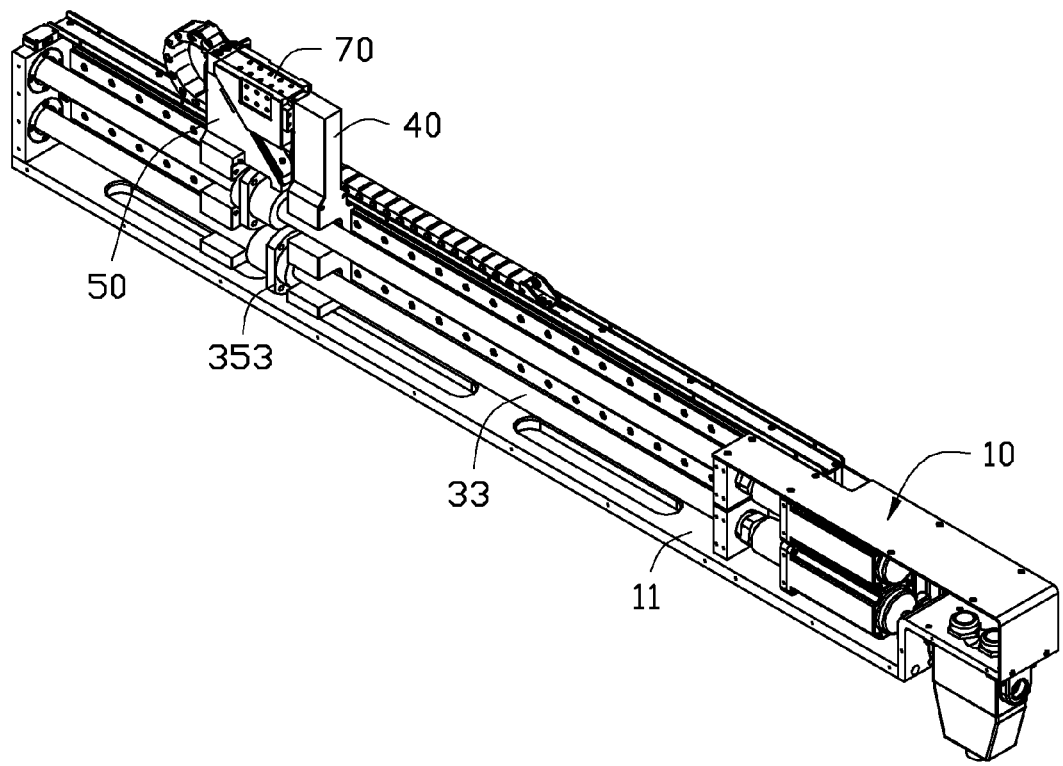
FIG. 6 shows a schematic view of a first operating mode of the conveying device, wherein the carrying mechanism is lifted up to a top position.
Figure 7:
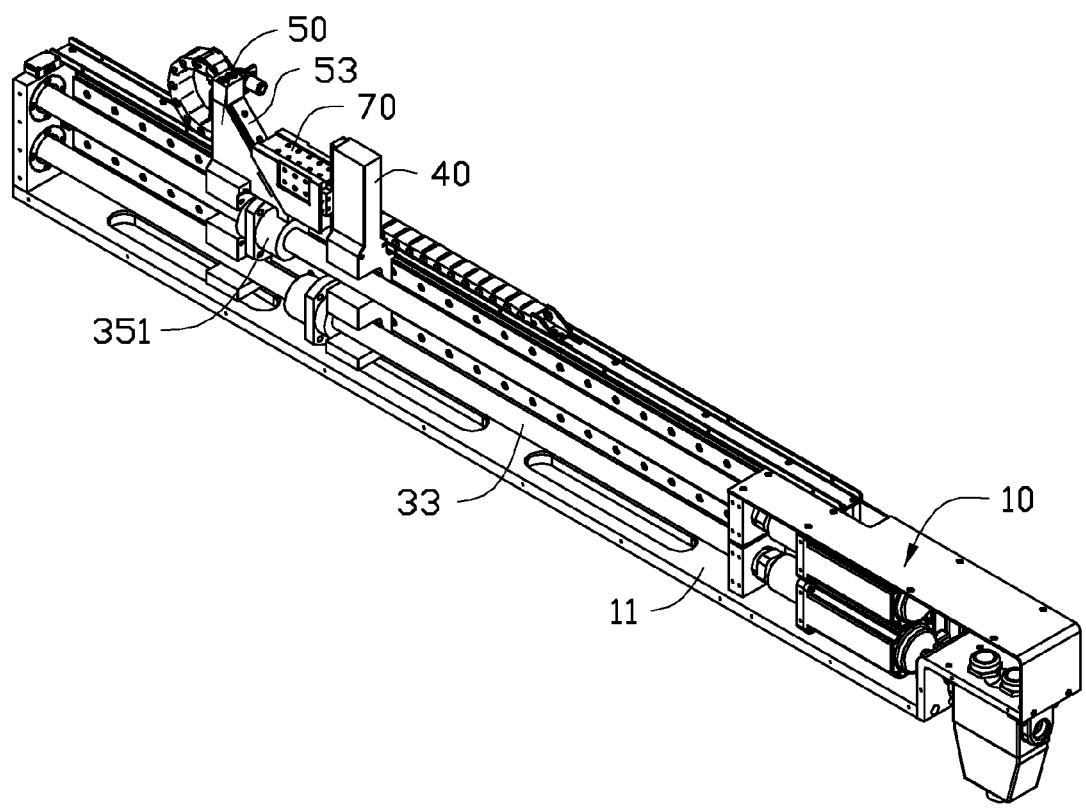
FIG. 7 is similar to FIG. 6, showing a schematic view of a second operating mode of the conveying device, wherein the carrying mechanism is positioned at a lower position.

Also referring to FIGS. 6 and 7, in use, the workpieces are obtained and placed on the carrying body 71 of the carrying mechanism 70. The two drivers 31 drive the screw rods 33 to rotate, and the screw members 35 together with the first and second sliding assemblies 40, 50 are driven to slide along the pair of guiding rails 15. When the screw rods 33 are both rotated along a same direction, such as, a clockwise direction or a counterclockwise direction, the screw members 35 together with the first and second sliding assemblies 40, 50 are driven to slide along the same direction along the guiding rails 15. Thus, the carrying mechanism 70 is sandwiched between the first sliding assembly 40 and the second sliding assembly 50, and is driven with the first sliding assembly 40 and the second sliding assembly 50, to convey the workpieces along a horizontal direction. When the screw rods 33 are driven to rotate in opposite directions, one screw rod 33 is driven to rotate clockwise and the other screw rod 33 is rotated counterclockwise. Then, the screw members 35 together with the first and second sliding assembly 40, 50 are driven to slide away from, or towards, each other, in opposite directions, and being supported on the guiding rails 15 and the screw rods 33. The carrying mechanism 70 sandwiched between the first sliding assembly 40 and the second sliding assembly 50 is then driven to slide upward or downwards perpendicular to the horizontal motion/direction of the first sliding assembly 40 and the second sliding assembly 50.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A conveying device, comprising:
a housing;
a linear driving mechanism assembled within the housing;
a first sliding assembly assembled to the linear driving mechanism and driven to slide within the housing linearly by the linear driving mechanism;
a second sliding assembly slidably assembled within the housing and positioned adjacent to the first sliding assembly; and
a carrying mechanism slidably sandwiched between the first sliding assembly and the second sliding assembly;
wherein, the linear driving mechanism is capable of driving the first sliding assembly and the second sliding assembly to slide within the housing along a same direction or two opposite directions, thereby driving the carrying mechanism to slide linearly together with the first sliding assembly and the second sliding assembly, or to slide upward and downwards along a direction perpendicular to the sliding direction of the first sliding assembly and the second sliding assembly.

2. The conveying device of claim 1, wherein the linear driving mechanism comprises two drivers, two screw rods and two screw members; the two screw rods are parallely and rotatably assembled within the housing, the two drivers are connected to the two screw rods, respectively, thereby driving the two screw rods to rotate; the two screw members are rotatably sleeved on the two screw rods, respectively and fixed with the corresponding first sliding assembly and the second sliding assembly.

3. The conveying device of claim 2, wherein the housing comprises a bottom plate, a supporting plate extending perpendicularly from one side of the bottom plate, and a pair of guiding rails; the guiding rails are parallely mounted on the supporting plate, the two screw rods are positioned away from and parallel to the corresponding two guiding rails; the first and second sliding assemblies slidably engage with the two guiding rails, and positioned between the guiding rails and the screw rods.

4. The conveying device of claim 3, wherein each of the first sliding assembly and the second sliding assembly comprises a sliding member and a sliding rail fixed to one side thereof, the sliding member defines a pair of sliding grooves slidably engaging with the guiding rails; the carrying mechanism comprises a carrying body and two sliding sleeves positioned at opposite sides thereof, the two sliding rails of the first and second sliding assemblies slidably engages with the two sliding sleeves of the carrying mechanism.

5. The conveying device of claim 3, wherein the linear driving mechanism further comprises two shaft couplings, the two drivers are assembled within the housing and connected to the two screw rods, respectively, via the two shaft couplings.

6. The conveying device of claim 4, wherein each sliding member comprises a base portion and a mounting portion formed on one end of the base portion, the sliding grooves are defined in one side surface of the base portion; the mounting portion of one sliding member is an assembling portion, the assembling portion is substantially wedge-shaped and comprises an inclined mounting side surface; the mounting portion of the other sliding member is bar-shaped and comprises an upright mounting side surface; the two sliding rails are oppositely fixed to the inclined mounting side surface and the upright mounting side surface, respectively, and slidably engage with corresponding two sliding sleeves of the carrying mechanism.

7. The conveying device of claim 5, wherein the housing further comprises two support blocks, the two support blocks are oppositely mounted on two ends of the bottom plate, and resist against two ends of the pair of guiding rails, respectively; each support block defines two pivotal holes; two ends of the two screw rods are rotatably assembled into the corresponding pivotal holes of the two supporting blocks.

8. The conveying device of claim 7, wherein the housing further comprises a cover plate, the cover plate is detachably mounted to the bottom plate, and positioned parallel to the opposite supporting plate.

9. A conveying device, comprising:
a housing comprising a supporting plate and a pair of guiding rails parallely mounted on the supporting plate along a horizontal direction;
a first sliding assembly assembled within the housing and slidably engaging with the guiding rails;
a second sliding assembly slidably assembled within the housing and engaging with the guiding rails, and positioned adjacent to the first sliding assembly;
a linear driving mechanism assembled within the housing for driving the first sliding assembly and the second assembly to linearly slide relative to the guiding rails, along a same direction or two opposite directions; and
a carrying mechanism slidably sandwiched between the first sliding assembly and the second sliding assembly;
wherein, the carrying mechanism is capable of being driven to slide linearly together with the first sliding assembly and the second sliding assembly, or to slide upward and downwards along a direction perpendicular to the sliding direction of the first sliding assembly and the second sliding assembly.

10. The conveying device of claim 9, wherein the linear driving mechanism comprises two drivers, two screw rods and two screw members, the two screw rods are parallely and rotatably assembled within the housing and positioned parallel to the corresponding two guiding rails, the two drivers are connected to the two screw rods, respectively, thereby driving the two screw rods to rotate; the two screw members are rotatably sleeved on the two screw rods, respectively and fixed with the corresponding first sliding assembly and the second sliding assembly.

11. The conveying device of claim 10, wherein each of the first sliding assembly and the second sliding assembly comprises a sliding member and a sliding rail fixed to one side thereof, the sliding member defines a pair of sliding grooves slidably engaging with the guiding rails; the carrying mechanism comprises a carrying body and two sliding sleeves disposed at two opposite sides thereof, the two sliding rails of the first and second sliding assemblies slidably engage with the two sliding sleeves of the carrying mechanism.

12. The conveying device of claim 10, wherein the linear driving mechanism further comprises two shaft couplings, the two drivers are assembled within the housing and connected to the two screw rods, respectively, via the two shaft couplings.

13. The conveying device of claim 11, wherein each sliding member comprises a base portion and a mounting portion formed on one end of the base portion, the sliding grooves are defined in one side surface of the base portion; the mounting portion of one sliding member is an assembling portion, the assembling portion is substantially wedge-shaped and comprises an inclined mounting side surface; the mounting portion of the other sliding member is bar-shaped and comprise an upright mounting side surface; the two sliding rails are oppositely fixed to the inclined mounting side surface and the upright mounting side surface, and slidably engage with the corresponding two sliding sleeves of the carrying mechanism.

14. The conveying device of claim 13, wherein each base portion of the sliding member further defines a pair of guiding grooves opposite to the corresponding two sliding grooves; the housing further comprises two supporting blocks, the two supporting blocks are oppositely mounted on two ends of the supporting plate, each supporting block defines two pivotal holes; the two screw rods pass through the guiding grooves of the first and second sliding members, two ends of the two screw rods are rotatably assembled into the corresponding pivotal holes of the two supporting blocks.

15. The conveying device of claim 13, wherein the housing further comprises a cover plate, the cover plate is detachably mounted to the bottom plate, and positioned parallel to the opposite supporting plate.

* * * * *